Oct. 9, 1951    J. D. BALDWIN, JR., ET AL    2,570,421
HOSE COUPLING
Filed March 6, 1948

INVENTORS
JOHN D. BALDWIN, JR.
& CHARLES H. CRAWLEY
BY
Richey Watts
ATTORNEYS

Patented Oct. 9, 1951

2,570,421

UNITED STATES PATENT OFFICE 2,570,421

HOSE COUPLING

John D. Baldwin, Jr., South Euclid, and Charles H. Crawley, Euclid, Ohio, assignors to The Weatherhead Company, Cleveland, Ohio, a corporation of Ohio Application March 6, 1948, Serial No. 13,425

4 Claims. (Cl. 285—84)

This invention relates to hose ends, that is, to fittings adapted to be mounted on the ends of flexible hoses to connect the hoses into a fluid circuit. One application of the invention is to hoses for hydraulic brake systems, and it is so illustrated herein, but the invention is obviously capable of use generally in fluid systems.

General objects of the invention are to retain the hose tightly, to prevent leakage, to improve the durability and reliability of hose ends, and to promote economical fabrication and assembly onto the hose by mass-production methods.

A more specific object is to clamp a hose to a hose end by means adapted for production by simple forming operations.

A further object is to improve the manufacture of hose ends by assembling the hose end by employing a simple process involving distorting one part of the hose end into clamping engagement with the body of the hose end.

A still further object is to form a hose-clamping sleeve portion of a hose end by forming from sheet metal.

The manner in which these objects, as well as other objects and advantages of the invention, more or less ancillary in nature, are realized, will be apparent to those skilled in the art from the description herein of the preferred embodiment of the invention.

Referring to the drawings, which illustrate the preferred embodiment of the present invention applied to one type of fitting:

Figure 1:
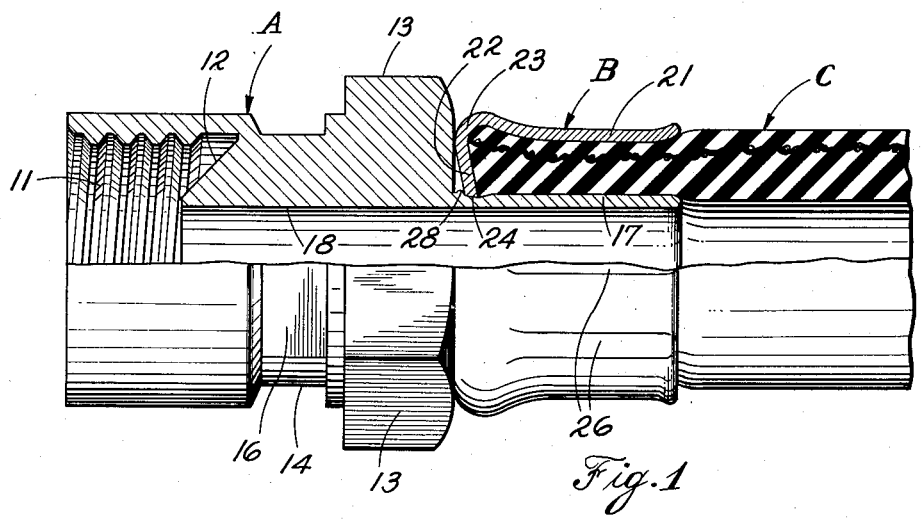
Fig. 1 is a side view, partly in longitudinal section, of a fitting assembled on a hose.

The hose end comprises a body A and a sleeve B, and is adapted for mounting on the end of a resilient hose C, which may be of any standard composition.

The form of the body is determined by the character of the fitting to which it is to be coupled. In the form illustrated, it comprises an internally-threaded portion 11, within which is a conical seat 12 designed to seal against the flared end of a tube held against the seat by a nut engaging the threads 11. A hexagonal portion 13 is provided for the application of wrenches, and the body may be of reduced section at 14 between the female fitting 11 and the nut 13. Flats 16 may be milled or otherwise formed on opposite sides of the central portion of the body to receive a securing clip, such as shown in the patent to Baldwin, No. 1,875,209.

A nipple 17 adapted to extend into the hose C projects axially from the body A, and a bore 18 extending through the body provides for the passage of fluid. Although the body may be composite, it is preferably a unitary piece of metal as shown, and may conveniently be machined from hexagonal stock.

Figure 3:
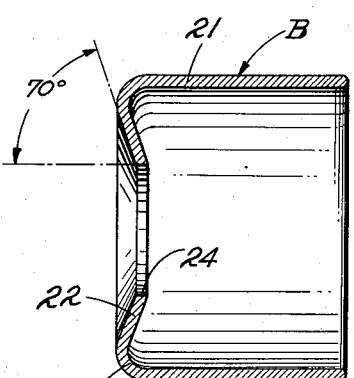
Fig. 3 is a side view, partly in longitudinal section, of the sleeve portion of the hose end before assembly.

The sleeve B is preferably drawn from sheet metal. The sleeve as finished ready to assemble on the body is illustrated in Fig. 3, and comprises cylindrical portion 21 jointed to an inwardly coned, or concave, end wall 22 by a curved portion 23. The end wall 22 is formed, preferably by drilling, with a straight central opening defined by an annular edge 24, preferably dimensioned for a light press fit over the nipple 17.

Figure 2:
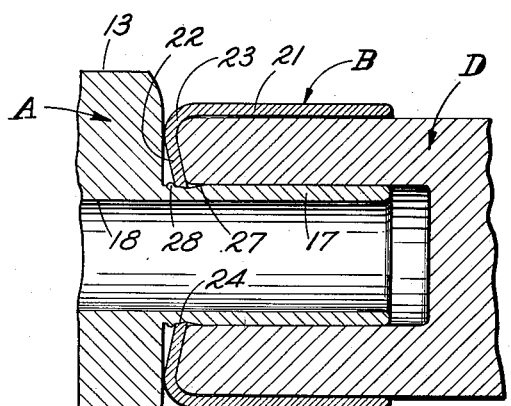
Fig. 2 is a partial longitudinal section illustrating the preferred method of assembling the components of the fitting.

To assemble the fitting according to the preferred method, the sleeve 21 is pushed over the nipple 17 into engagement with the nut portion 13 of the body, as shown in Fig. 2. The body A is held and backed up against movement to the left, as seen in Fig. 2, in any convenient manner, and a hollow punch D is introduced over the nipple 17 and within the sleeve B. In the illustrated embodiment, the leading face 41 of the punch is coned, but to a less extent than the end of the sleeve. The punch is driven against the end 22 of the sleeve to flatten the same, decreasing the diameter of the central hole in the wall 22 and contracting the annular edge 24 while moving the same axially along the nipple 17.

Figure 4:
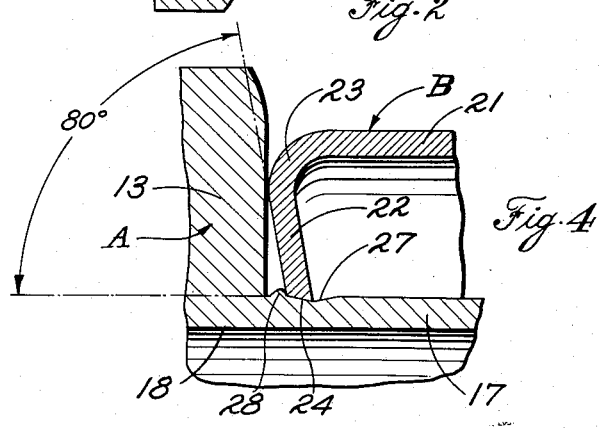
Fig. 4 is an enlarged detail sectional view of the engaging portions of the nipple and sleeve.

This action causes the annular edge 24 to shear the material of the nipple 17, producing a groove 27 in the surface of the nipple into which the edge 24 extends, and a ridge 28 formed of material sheared out to make the groove 27, and against which the end wall 22 abuts, as illustrated in enlarged detail in Fig. 4. Thus the annular edge 24 becomes smaller in diameter than the external diameter of the adjacent portions of the nipple 17, without appreciably deforming or constricting the internal diameter of the nipple 17.

Preferably, as illustrated, the end wall 22 is not completely flattened but remains partially coned or concave. In the specific embodiment, for example, the end wall 22 is coned at an angle of about 70° to the axis before assembly and is flattened to an angle of about 80° by the punch D. In a specific fitting in which the external diameter of the nipple 17 is ¼ of an inch and the other parts are proportioned as shown in the drawings, this amount of flattening contracts the diameter of the annular edge 24 to about .010 of an inch less than the diameter of the nipple 17. The sleeve B is thereby securely locked to the nipple since any force tending to pull the nipple from the sleeve tends to further flatten the end wall 22 and thereby further contract the annular edge 24. The annular edge 24 cannot slide along the nipple since it is seated or imbedded in the groove 27 and is smaller in diameter than the adjacent surface of the nipple. The ridge 28 resists movement of the end wall 22 in the opposite direction.

The securing of the sleeve on the nipple completes the fitting, and it is ready to be secured to the hose C, the final assembly being illustrated in Fig. 1. The end of the hose is slipped over the nipple 17 and into the annular space defined by the nipple and the sleeve B, bottoming against the end wall 22 of the sleeve. The sleeve is then reduced in diameter to compress the hose between the sleeve and nipple. This is preferably accomplished by a crimping operation, which may be performed by machines such as that disclosed in the Patent to Hunziker No. 2,211,622. The crimped and compressed portion of the sleeve is indicated at 26 in Fig. 1.

It will be noted that both the seating of the sleeve against the face of the nut 13, or other abutment means, and the insertion of the punch D between the sleeve and nipple insure accurate alignment of the sleeve on the nipple.

It will be apparent to those skilled in the art that the fitting of this invention is highly advantageous in that no difficult or expensive operations are required in its production. The machining operations on the body are simple and can be substantially completed on an automatic screw machine, the sleeve can be formed on a drawing press, and the assembly of these two parts is completed by a simple rapid single operation. The assembly of the hose with the hose end is facilitated by the fact that the two parts of the hose end are firmly secured together before assembly with the hose. Similarly, the invention is adaptable to hoses and fittings of all sizes and types since it is not necessary to expand or otherwise operate on the nipple after it has been assembled in the hose.

The application of the sleeve B of the type disclosed herein does not require the presence of a shoulder on the body such as the face of the nut 13, since the end wall 22 is held against movement toward the body by the ridge 28. The sleeve may be fixed at an intermediate position upon the nipple or an equivalent section of tubing, in which case the operation of assembling the sleeve on the tubing may be performed between a die such as D in Fig. 2 and an opposing die or anvil in the preferred embodiment as illustrated which fits over the tubing or nipple. The presence of the shoulder is advantageous, however, since it strengthens the fitting by eliminating any chance of loosening the sleeve by a force acting in the direction from the free end of the sleeve to the closed end.

It will be understood that the invention is not limited in its broader aspects to the degree of flattening of the end wall 22 or to the forming of the annular edge 24 of the hole in the end wall 22 so as to have a light press fit over the nipple 17 before the sleeve is locked in place. The relative diameter of the external surface of the nipple and the hole in the end wall 22 and the amount of contraction of the annular edge 24 by the flattening of the end wall may be varied to secure any desired gripping force and shearing action between the sleeve and the nipple. Similarly, the shearing action of the annular edge 24 into the surface of the nipple is not necessarily accompanied by axial movement of the edge 24 with respect to the nipple as in the preferred embodiment. The portion of the nipple 17 which engages the interior of the hose C or the inner surface of the sleeve which engages the hose, or both, may, of course, be roughened or otherwise suitably formed to increase the frictional engagement with the hose as disclosed for example in the patents to Weatherhead, 2,008,650 and 2,133,313 or the patents to Hunziker, 2,311,662 and 2,311,663.

Many other modifications and re-arrangements of the parts may be resorted to without departing from the scope of the invention as defined in the following claims.

What is claimed is:

1. A hose coupling comprising a nipple having a free end and a sleeve fixed on and surrounding the free end of the nipple, said sleeve and nipple defining an annular pocket for reception of a hose, said sleeve comprising a circumferentially-continuous tubular portion and an inwardly-directed flange extending from one end thereof, said flange having a radially inner portion inclined toward the other end of said tubular portion, said flange having its inner edge in compressive engagement with said nipple, the inner edge of said flange being disposed in a groove in said nipple formed by forcing said flange longitudinally along said nipple with the flange in engagement with the nipple to increase the angle of inclination of said inclined flange portion relative to the axis of said tubular portion of the sleeve and thereby providing a toggle action between said flange and said nipple, said groove being bounded by a ridge of material sheared up by said flange and engaged thereby, said continuous sleeve portion restraining said flange against radial expansion, relative motion of said sleeve and said nipple tending to slip said sleeve over the free end of said nipple increasing the compressive engagement of said flange and nipple.

2. A hose coupling comprising a body member having a radial shoulder from which extends a nipple having a free end, a sleeve fixed on and surrounding the nipple, said sleeve and nipple defining an annular pocket for reception of a hose, said sleeve comprising a circumferentially-continuous tubular portion and a radially inwardly-directed substantially frusto conical, circumferentially continuous flange extending from one end thereof, said flange being inclined toward the other end of said tubular portion, said flange having its inner edge in compressive engagement with said nipple, the inner edge of said flange being disposed in a groove in said nipple formed by forcing said flange longitudinally along said nipple with the flange in engagement with the nipple to increase the angle of inclination of said inclined flange portion relative to the axis of said tubular portion of the sleeve and thereby providing a toggle action between said flange and said nipple, said groove being bounded by a ridge of material sheared up by said flange and engaged thereby, said continuous sleeve portion restraining said flange against radial expansion, relative motion of said sleeve and said nipple tending to slip said sleeve over the free end of said nipple increasing the compressive engagement of said flange and nipple, the radially outer portion of said flange being in compressive engagement with said body shoulder.

3. A hose coupling comprising a nipple having a free end and a sleeve fixed on and surrounding the free end of the nipple, said sleeve and nipple defining an annular pocket for reception of a hose, said sleeve comprising a circumferentially-continuous tubular portion and a radially inwardly-directed substantially frusto conical, circumferentially continuous flange extending from one end thereof, said flange being inclined relative to the axis of said tubular portion toward the other end of said tubular portion, said flange having its inner edge in compressive engagement with said nipple, the inner edge of said flange being disposed in a groove in said nipple formed by forcing said flange longitudinally along said nipple with the flange in engagement with the nipple to increase the angle of inclination of said inclined flange portion relative to the axis of said tubular portion of the sleeve and thereby providing a toggle action between said flange and said nipple, said relative angle of inclination of said flange after deformation thereof exceeding 45°, said groove being bounded by a ridge of material sheared up by said flange and engaged thereby, said continuous sleeve portion restraining said flange against radial expansion, relative motion of said sleeve and said nipple tending to slip over said sleeve over the free end of said nipple increasing the compressive engagement of said flange and nipple.

4. A hose coupling comprising a nipple having a free end and a sleeve fixed on and surrounding the free end of the nipple, said sleeve and nipple defining an annular pocket for reception of a hose, said sleeve comprising a circumferentially-continuous tubular portion and a radially inwardly-directed substantially frusto conical, circumferentially continuous flange extending from one end thereof, said flange being inclined toward the other end of said tubular portion, said flange having its inner edge in compressive engagement with said nipple, the inner edge of said flange being disposed in a groove in said nipple formed by forcing said flange longitudinally along said nipple with the flange in engagement with the nipple to increase the angle of inclination of said inclined flange portion relative to the axis of said tubular portion of the sleeve and thereby providing a toggle action between said flange and said nipple, said groove being bounded by a ridge of material sheared up by said flange and engaged thereby, said continuous sleeve portion restraining said flange against radial expansion, relative motion of said sleeve and said nipple tending to slip said sleeve over the free end of said nipple increasing the compressive engagement of said flange and nipple, and a hose of flexible material having its end disposed in said pocket.

JOHN D. BALDWIN, Jr.
CHARLES H. CRAWLEY.

REFERENCES CITED

The following references are of record in the file of this patent:

UNITED STATES PATENTS

| Number | Name | Date |
|---|---|---|
| 1,109,042 | Claflin | Sept. 1, 1914 |
| 1,179,552 | Nelson | Apr. 18, 1916 |
| 1,265,709 | Dies | May 7, 1918 |
| 1,951,860 | Cowles | Mar. 20, 1934 |
| 1,965,426 | Nelson | July 3, 1934 |
| 2,090,251 | Cowles | Aug. 17, 1937 |
| 2,142,752 | Howard | Jan. 3, 1939 |
| 2,181,673 | Tompkins | Nov. 28, 1939 |
| 2,209,181 | Wendel | July 23, 1940 |
| 2,216,838 | Hoffman | Oct. 8, 1940 |
| 2,230,116 | Kreidel | Jan. 28, 1941 |
| 2,314,000 | Lusher | Mar. 16, 1943 |
| 2,401,921 | Fisher | June 11, 1946 |